United States Patent
Webster, Jr. et al.

(10) Patent No.: US 7,218,273 B1
(45) Date of Patent: May 15, 2007

(54) METHOD AND DEVICE FOR BORESIGHTING AN ANTENNA ON A MOVING PLATFORM USING A MOVING TARGET

(75) Inventors: James B. Webster, Jr., Salt Lake City, UT (US); LaMar K Timothy, Kaysville, UT (US); Fred M. Strohacker, Sandy, UT (US)

(73) Assignee: L3 Communications Corp., New York, NY (US)

( * ) Notice: Subject to any disclaimer, the term of this patent is extended or adjusted under 35 U.S.C. 154(b) by 0 days.

(21) Appl. No.: 11/441,514

(22) Filed: May 24, 2006

(51) Int. Cl.
*G01S 7/40* (2006.01)
*G01S 13/00* (2006.01)

(52) U.S. Cl. .......................... 342/174; 342/42; 342/43; 342/73; 342/74; 342/75; 342/77; 342/147; 342/149; 342/165; 342/173; 342/175; 342/195; 342/359; 342/367; 342/368; 342/377; 343/703; 343/705; 343/709

(58) Field of Classification Search .............. 342/5–11, 342/42–51, 73–81, 147–158, 165–175, 187, 342/195, 359, 367–384; 343/703, 705–710, 343/757–766
See application file for complete search history.

(56) References Cited

U.S. PATENT DOCUMENTS

| | | | |
|---|---|---|---|
| 3,965,475 A | 6/1976 | Deerkoski et al. | |
| 4,084,159 A * | 4/1978 | Anderson et al. | 342/77 |
| 4,095,230 A | 6/1978 | Salmond et al. | |
| 4,488,155 A * | 12/1984 | Wu | 342/376 |
| 4,532,516 A * | 7/1985 | Frampton et al. | 342/47 |
| 4,823,134 A | 4/1989 | James et al. | |
| 5,166,689 A * | 11/1992 | Pankow et al. | 342/77 |
| 5,347,286 A | 9/1994 | Babitch | |
| 5,400,033 A * | 3/1995 | Hablani | 342/77 |
| 5,400,037 A * | 3/1995 | East | 342/372 |
| 5,485,156 A * | 1/1996 | Manseur et al. | 342/77 |
| 5,530,449 A * | 6/1996 | Wachs et al. | 342/174 |
| 5,546,090 A * | 8/1996 | Roy et al. | 342/174 |
| 5,557,285 A | 9/1996 | Bender et al. | |
| 6,016,120 A | 1/2000 | McNabb et al. | |
| 6,124,824 A * | 9/2000 | Xu et al. | 342/174 |
| 6,163,296 A * | 12/2000 | Lier et al. | 342/174 |
| 6,166,691 A * | 12/2000 | Lindqvist | 342/174 |
| 6,184,825 B1 * | 2/2001 | Wehner et al. | 342/359 |
| 6,195,045 B1 * | 2/2001 | Xu et al. | 342/368 |
| 6,229,480 B1 * | 5/2001 | Shintani | 342/359 |
| 6,281,839 B1 | 8/2001 | Nielsen | |
| 6,344,820 B1 * | 2/2002 | Shiomi et al. | 342/174 |
| 6,400,315 B1 | 6/2002 | Adler et al. | |
| 6,417,803 B1 | 7/2002 | De La Chapelle et al. | |
| 6,433,736 B1 | 8/2002 | Timothy et al. | |
| 6,462,704 B2 * | 10/2002 | Rexberg et al. | 342/174 |
| 6,480,153 B1 * | 11/2002 | Jung et al. | 342/368 |

(Continued)

*Primary Examiner*—Bernarr E. Gregory
(74) *Attorney, Agent, or Firm*—Thorpe North & Western LLP (57) ABSTRACT

A technique for boresighting an antenna mounted on a moving platform is described. The technique uses a concurrently moving calibration target. Target navigation data and platform navigation data are used to compensate for movement of the target and the platform. The antenna pointing direction is biased in a direction which provides a best signal quality, and the bias used to determine antenna boresight calibration factors. The boresight correction factors can be used for open loop pointing.

31 Claims, 4 Drawing Sheets

U.S. PATENT DOCUMENTS

| | | |
|---|---|---|
| 6,483,458 B1 | 11/2002 | Carson |
| 6,535,160 B1 * | 3/2003 | Myers et al. .................. 342/81 |
| 6,559,799 B2 * | 5/2003 | Aoyama et al. ............ 342/377 |
| 6,646,598 B1 | 11/2003 | Timothy et al. |
| 6,731,240 B2 | 5/2004 | Dybdal et al. |
| 6,771,216 B2 * | 8/2004 | Patel et al. .................. 342/368 |
| 6,809,685 B2 * | 10/2004 | Hancock ...................... 342/368 |
| 6,853,330 B1 * | 2/2005 | Krikorian et al. ........... 342/149 |
| 6,914,554 B1 * | 7/2005 | Riley et al. ................... 342/77 |
| 6,961,016 B1 * | 11/2005 | Pozgay ......................... 342/77 |
| 7,046,191 B2 * | 5/2006 | Tokutsu et al. ............. 342/165 |
| 7,053,828 B1 * | 5/2006 | Goodzeit et al. ........... 342/359 |
| 2002/0180634 A1 * | 12/2002 | Carson ......................... 342/74 |
| 2003/0058156 A1 * | 3/2003 | Myers et al. .................. 342/77 |
| 2003/0058166 A1 * | 3/2003 | Hirabe ........................ 342/368 |
| 2004/0207554 A1 * | 10/2004 | Schuster et al. ............ 342/165 |
| 2005/0020279 A1 | 1/2005 | Markhovsky et al. |

* cited by examiner

METHOD AND DEVICE FOR BORESIGHTING AN ANTENNA ON A MOVING PLATFORM USING A MOVING TARGET

FIELD OF THE INVENTION

The present invention relates generally to antenna boresighting, and more particularly to boresighting an antenna on a moving platform using a moving calibration target.

BACKGROUND

Communications systems often use directional antennas to focus transmitted and received power in a desired direction. The direction of maximum transmitted and received power is sometimes referred to as the "boresight" of the antenna. Highly directional or narrow beamwidth antennas must be pointed accurately to ensure the antenna boresight is oriented in the desired direction. For example, for communication between two moving platforms, narrow beamwidth antennas are constantly adjusted as the pointing angles change due to relative movement of the platforms. Additional stabilization may also be required to accommodate changes in platform orientation, for example, using an inertial reference that relates the platform orientation (roll, pitch, and yaw/heading) to the earth.

Antenna pointing can be performed "closed loop," where the antenna pointing angles are continuously adjusted to maximize received (or transmitted) signal power. Closed loop pointing systems typically require complex feed arrangements or complex receiver signal processing, which can increase cost. Hence, in many applications, closed loop pointing is undesirable.

Antenna pointing can also be performed "open loop," where the antenna pointing direction is determined algorithmically and the antenna is directed to point in a particular direction. Typically, open loop antenna pointing algorithms translate platform and target locations from inertial coordinates, determined by an inertial reference unit or attitude reference system, into relative ship's coordinates of azimuth and elevation which is provided to the antenna. In open loop pointing, the antenna is therefore calibrated to ensure that the boresight is accurately directed towards the specified azimuth and elevation.

Various sources of error can occur in an antenna system which results in boresight errors. For example, antennas are often stabilized with respect to an attitude reference system to compensate for attitude changes (roll, pitch and yaw) of the platform. For example, stabilization for platform orientation sometimes involves providing an attitude reference system at or near the antenna. The attitude reference system can be, for example, a set of accelerometers or a complete inertial navigation system. There can, however, be alignment errors between the axes of the antenna system and the axes of the attitude reference system. These alignment errors result in misalignment or boresight error between the desired and actual antenna pointing direction. Replacement of components in the antenna or attitude reference system can make recalibration of the boresight necessary. Other potential sources of boresight error include mechanical tolerances in the antenna positioning equipment, mechanical tolerances in the antenna beam forming elements, and electrical tolerances.

Traditionally, boresighting an antenna has been performed by holding the platform to which the antenna is mounted stationary (fixed to the earth) while the antenna is pointed at a fixed calibration target. This approach is undesirable in many circumstances. For example, a ship cannot be held in a stationary position while at sea due to sea swell, and thus is returned to port to boresight an antenna. Similarly, an aircraft is usually required to land in order to perform boresighting. This can prove inconvenient, for example in military applications, since either the mission must be interrupted or the antenna operated without the boresight calibrated. Furthermore, requiring the calibration target to remain in a fixed position can prove inconvenient. For example, this has typically meant that calibration targets are land based, again making it difficult to boresight an antenna on a ship at-sea.

SUMMARY OF THE INVENTION

It has been recognized that it would be advantageous to develop a technique for boresighting an antenna mounted on a moving platform, where the calibration target can be moving while the calibration is performed.

One embodiment of the present invention is a method for boresighting an antenna mounted on a moving platform using a concurrently moving calibration target. The method can include receiving target navigation data from the calibration target describing movement of the calibration target. The method can also include pointing the antenna in a nominal direction toward the calibration target using the target navigation data to compensate for movement of the calibration target. Pointing the antenna can also include using platform navigation data to compensate for motion of the moving platform. The method can also include offsetting the nominal direction of pointing to a bias direction, where the bias direction is found which corresponds to a best signal quality received from the calibration target. Finally, the method can include computing antenna boresight correction factors from a difference between the bias direction and the nominal direction. The boresight correction factors can be used for open loop pointing.

Other embodiments of the present invention include a system for boresighting an antenna subsystem mounted on a moving platform using a concurrently moving calibration target, and a system for boresighting an antenna on a ship at sea.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Figure 1:
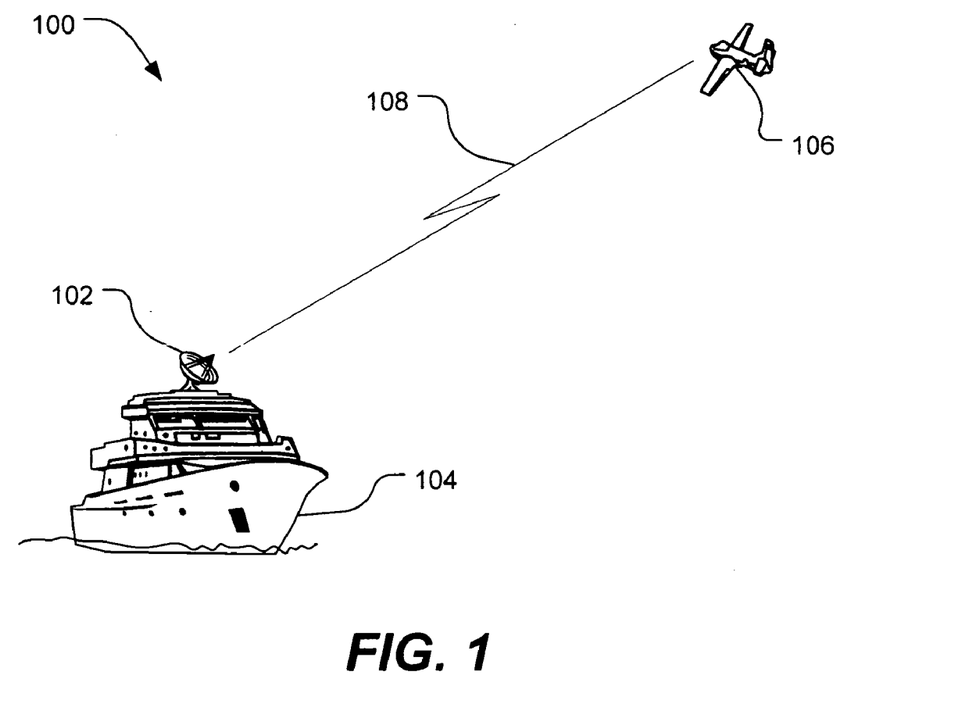
FIG. 1 is an illustration of a system for boresight calibrating an antenna mounted on a moving platform in accordance with an embodiment of the present invention.

FIG. 1 illustrates a system for boresight calibrating an antenna mounted on a moving platform using a concurrently moving calibration target in accordance with an embodiment of the present invention. The antenna 102 is mounted on a moving platform 104, for example a ship at sea. The calibration target 106, for example a satellite, aircraft, or unmanned airborne vehicle, is concurrently moving. Target navigation data is provided from the moving calibration target to the antenna, for example via a radio communication link 108 through the antenna.

Figure 2:
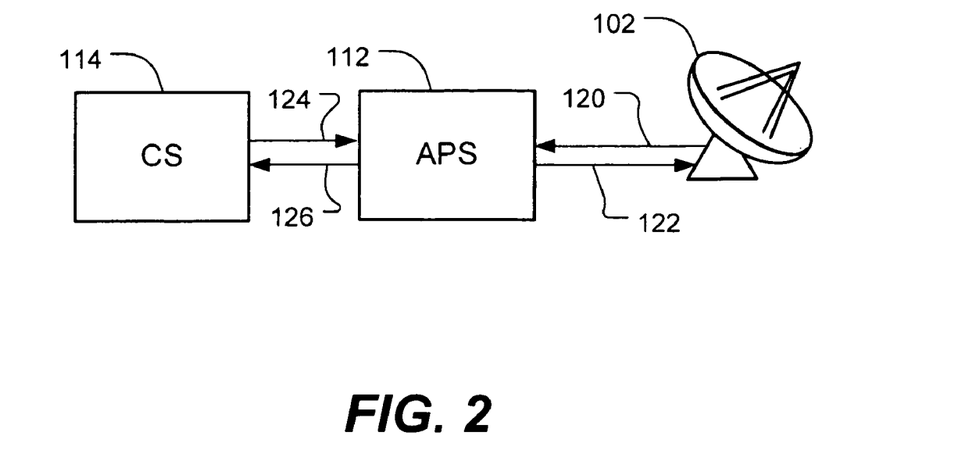
FIG. 2 is a block diagram of the system of FIG. 1 providing additional detail.

The system includes, as shown in further detail in FIG. 2, an antenna pointing subsystem 112 and a calibration subsystem 114. The antenna pointing subsystem receives target navigation data 120, for example via the antenna 102, and controls the antenna pointing direction. The antenna pointing subsystem 112 uses the target navigation data to compensate for motion of the moving calibration target and to direct the antenna beam nominally toward the calibration target 106 (FIG. 1). Although it is preferred that the target navigation data is received via the radio link, target navigation data can be received through another means, for example, a communication system independent of the antenna. The antenna pointing subsystem also uses platform navigation data to compensate for motion of the moving platform. For example, the antenna pointing subsystem can provide azimuth and elevation commands 122 to the antenna.

Target navigation data can include position information defining the target position in a reference coordinate frame. Various reference coordinate frames are known to one of skill in the art, including, for example, World Geodetic System, 1984. For example, the target navigation data can be derived using the Global Positioning System (GPS). Platform navigation data can be received from a navigation sensor on the platform, for example an inertial navigation system or GPS receiver. Platform navigation data can also include attitude information (roll, pitch, and yaw orientation) for the platform.

Pointing the antenna using the target navigation data and platform navigation can be performed using techniques known to one in the art. For example, given the position of the platform and target in a common coordinate system, a line of sight vector can be determined by subtracting the two positions. If the positions of the platform and target are known in different coordinate systems, one can be transformed into the coordinate system of the other using appropriate coordinate translation and rotation equations. For example, the target navigation data may be transformed into platform relative coordinates using the platform navigation data. Once the line of sight vector is obtained, it can then be transformed into the coordinate system of the antenna. Pointing the antenna can include stabilizing the antenna for changes in the attitude of the platform.

Figure 3:
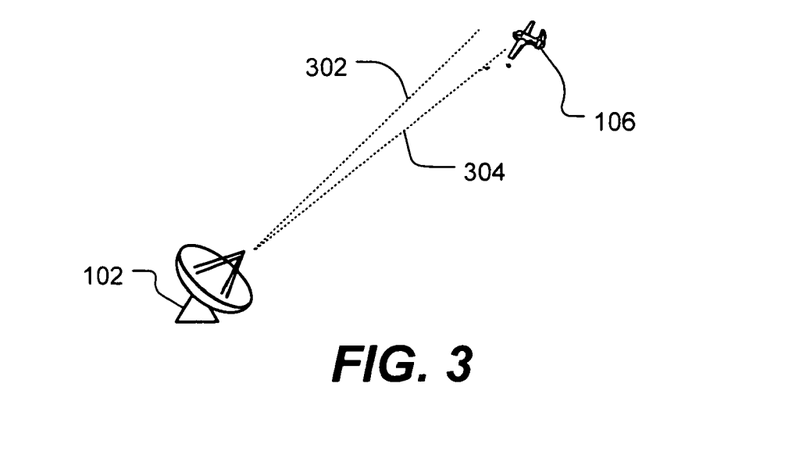
FIG. 3 is an illustration of boresight pointing error in accordance with an embodiment of the present invention.

It should be appreciated from the foregoing that the antenna pointing subsystem 112 (FIG. 2) will thus maintain the antenna 102 (FIGS. 1,2) pointing in a nominal direction oriented toward the target 106 (FIG. 1), even though the attitude of the platform, location of the platform, and location of the target are changing. As illustrated in FIG. 3, when boresight errors are present, however, the nominal direction 302 of pointing of the antenna 102 will not be perfectly aligned with the target 106. Hence, the peak gain of the antenna is not realized.

Calibration is accomplished by superimposing bias values into the antenna pointing direction. The calibration subsystem 114 (FIG. 2) provides bias values 124 to the antenna pointing subsystem 112 to cause a deviation in the direction of the antenna beam and accepts signal quality values 126 from the antenna pointing subsystem. When the pointing is offset from the nominal direction to a deviated direction 304 (FIG. 3) in an amount exactly equal to the boresight error, the peak gain will likely be realized, and increased signal quality will result. Of course, the boresight error is generally not known, and thus a number of bias values can be tested, searching for a bias value which results in the best signal quality as described further below. Once the bias value which results in the best signal quality is found, this corresponds to the boresight error, and boresight correction factors can be determined from the bias value. It should be appreciated that the calibration process can proceed slowly, since the antenna pointing system is maintaining the antenna pointing in the nominal direction (plus deviations due to bias values). Thus, one advantage of the system is that calibration can be accomplished under manual control, avoiding the need for expensive feed designs or complex tracking loops. The boresight correction factors can be stored in the antenna pointing subsystem in an electronic form (e.g., stored data in a computer). Then, during operational (e.g., open loop) antenna pointing, the antenna pointing can be adjusted algorithmically using the boresight correction factors to provide accurate open loop pointing.

Figure 4:
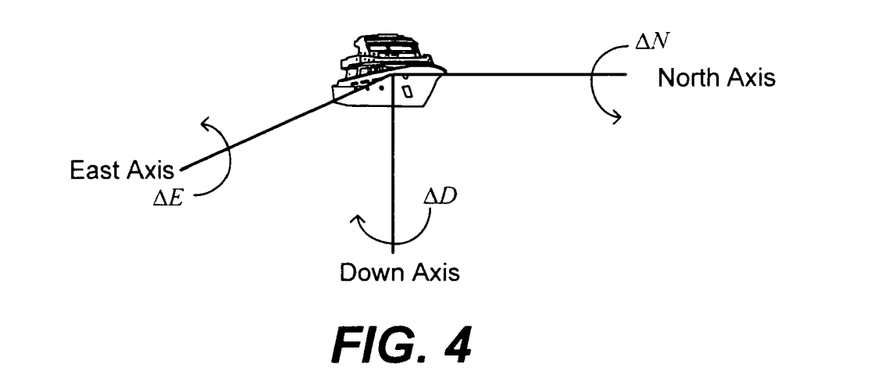
FIG. 4 is an illustration of a coordinate frame for describing boresight correction factors in accordance with an embodiment of the present invention.

The boresight correction factors will now be described in further detail with reference to an azimuth/elevation type antenna. The boresight error expressed as an azimuth and elevation error may not be constant for all possible pointing directions. Consider, for example, where the azimuth axis is tilted in the east-west axis (rotated about the north-south axis), dipping below the horizon in the east direction and above the horizon in the west direction. This will result in a negative elevation error (or positive elevation bias) in the east direction and a positive elevation error (or negative elevation bias) in the west direction. Hence, it can be preferable to express boresight correction factors in a north-east-down (NED) coordinate system, rather than azimuth and elevation. Boresight correction factors within the NED system are designated $\Delta N$, $\Delta E$ and $\Delta D$, where each boresight correction factor represents a rotation about the corresponding axis, as illustrated in FIG. 4. Of course, other coordinate systems may prove useful for describing the boresight correction factors depending on the configuration of the antenna and platform. For example, boresight correction factors may be referenced to the coordinate system of the platform navigation system, or even to the local coordinate system of the antenna. For example, if the primary source of error is the antenna mounting system, boresight correction factors may be referenced to each axis in the antenna mounting system. Various other combinations will occur to one of skill in the art having possession of this disclosure.

The boresight correction factors, $\Delta N$, $\Delta E$, and $\Delta D$ are within NED tangent plane coordinates and can be found from the bias values as follows. Bias values are found in tangent plane coordinates, measured in azimuth and elevation (Az, El) where Az is referenced to north (positive in a clockwise rotation about the vertical axis), and El is referenced to the tangent plane horizon. Two sets of bias values are to be used, separated approximately 90 degrees in azimuth, given by $(\Delta Az_1, \Delta El_1)$, corresponding to the bias value providing the highest signal quality referenced from a first pointing direction $(Az_1, El_1)$, and $(\Delta Az_2, \Delta El_2)$, corresponding to the bias values providing the highest signal quality referenced from a second pointing direction $(Az_2, El_2)$. The boresight correction factors are found by solving the system of equations:

$$\Delta D = \frac{1}{2}(\Delta Az_1 + \Delta Az_2)$$

$$\Delta El_1 = \sin(Az_1)\Delta N - \cos(Az_1)\Delta E$$

$$\Delta El_2 = \sin(Az_2)\Delta N - \cos(Az_2)\Delta E.$$

The boresight correction factors can be calculated by the calibration unit and provided to the antenna pointing subsystem. Derivation of these equations will be apparent to one of skill in the art. Various techniques for solving such a system of equations will occur to one of skill in the art.

Although two sets of bias values can be used as described above, a greater number of sets of bias values can be used to obtain the boresight correction factors. For example, a minimum mean square error estimate can be performed to obtain the boresight correction factors from multiple sets of bias values. In general, if a larger number of boresight correction factors (e.g., expressed in multiple coordinate frames) are desired, more sets of bias values taken from different pointing directions are used.

Several advantages of the system will now be apparent to one of skill in the art. The boresight correction factors that can be applied electronically and hence mechanical shimming and pinning the antenna and associated equipment can be avoided. Additionally closed loop tracking of the antenna is not required, since, once the boresight correction factors are obtained, accurate open loop pointing can be maintained. Calibration can be performed on a time scale compatible with manual operation and thus the boresight calibration system can be used with many different antenna systems providing a signal quality measure. Hence, equipment for forming multiple antenna beams (so-called monopulse tracking) or performing a conical scan is not required.

Because boresighting can be performed while the platform is moving, it is not necessary to interrupt a mission and return to port or base if recalibration of the antenna boresight becomes necessary. Furthermore, since a moving target can be used as the calibration target, many different signal sources that can be received by the antenna can be used as the calibration target. For example, a ship at sea can use another ship as the calibration target or an aircraft, avoiding the need to be within view of a fixed calibration target on land. Similarly, an aircraft can use another aircraft as a calibration target. The system thus provides great flexibility in when and where boresight calibration is performed and what is used as the calibration target.

Figure 5:
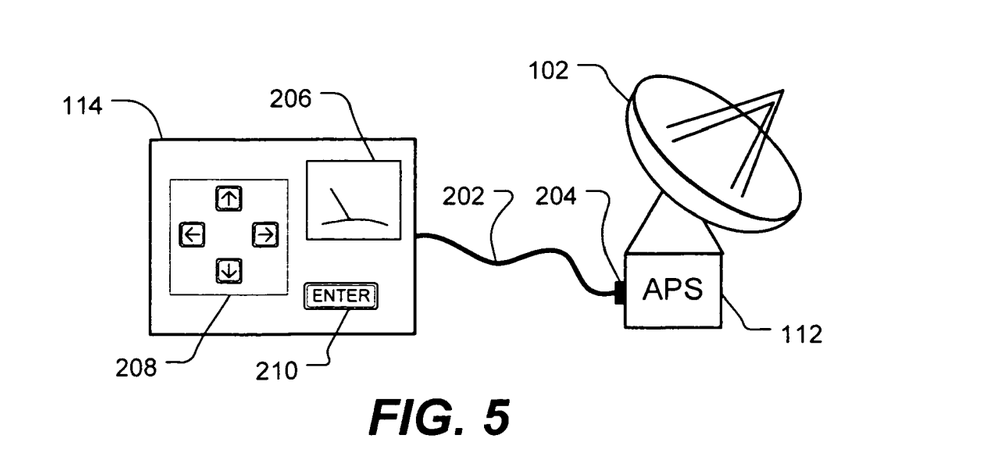
FIG. 5 is an illustration of a system for boresight calibrating an antenna mounted on a moving platform in accordance with another embodiment of the present invention.

In accordance with another embodiment of the present invention, the calibration unit can be packaged in a unit which is detachably connected to the antenna. For example, as illustrated in FIG. 5, the calibration subsystem 114 can connect to the antenna pointing subsystem 112 via a cable 202 and connector 204, and provide an operator interface to allow an operator to control the boresight calibration. The operator interface can include, for example, a visual signal quality indicator 206 and controls 208 for biasing the azimuth and elevation. The controls can provide either a fixed or variable amount of bias for each key stroke. For example, each key stroke may introduce an additional 1 degree of bias, with the calibration unit keeping track of the total amount of bias. Alternatively, the controls may provide a variable amount of bias for each key stroke, for example, 1 degree, 0.1 degrees, or 0.02 degrees. The variable amount of bias can be controlled either manually or automatically. For example, the amount of bias entry per key entry can automatically be adjusted depending on the distance between antenna and the target, decreasing the amount of bias entry as the target is moved further away. Various configurations of the controls will occur to one of skill in the art having possession of this disclosure.

The operator interface may also include an enter key 210 to trigger calculation and storing of the boresight correction factors back to the antenna pointing subsystem. The calibration unit may be implemented in software running on a portable computer (PC), ruggedized PC, tablet PC, personal data assistant, or specialized hardware as will occur to one of skill in the art. Thus, the calibration subsystem can be present only during calibration, reducing the amount of equipment that is permanently maintained at the antenna. This is advantageous, since the antenna is typically located in a harsh, space limited, or difficult to access environment. Optionally, the calibration subsystem may also be implemented as part of the functionality of an outer-loop controller of the antenna pointing system With respect to the signal quality, several different measurement types can be used in embodiments of the present invention. Signal strength provides a direct measure of the effective antenna gain, and thus will be at a maximum when the antenna boresight is directed toward the calibration target. Signal strength can be measured directly, for example, using a power detector, or can be measured indirectly, for example measuring automatic gain control voltage within a receiver. Signal to noise ratio is closely related to signal strength, and thus can also be used. Additionally, bit error rate can be measured, for example, for a digital data stream communicated between the platform and the calibration target, providing an indirect measure of signal quality. For example, bit error rate may be estimated from a rate of error correction in a forward error correction decoder.

Figure 6:
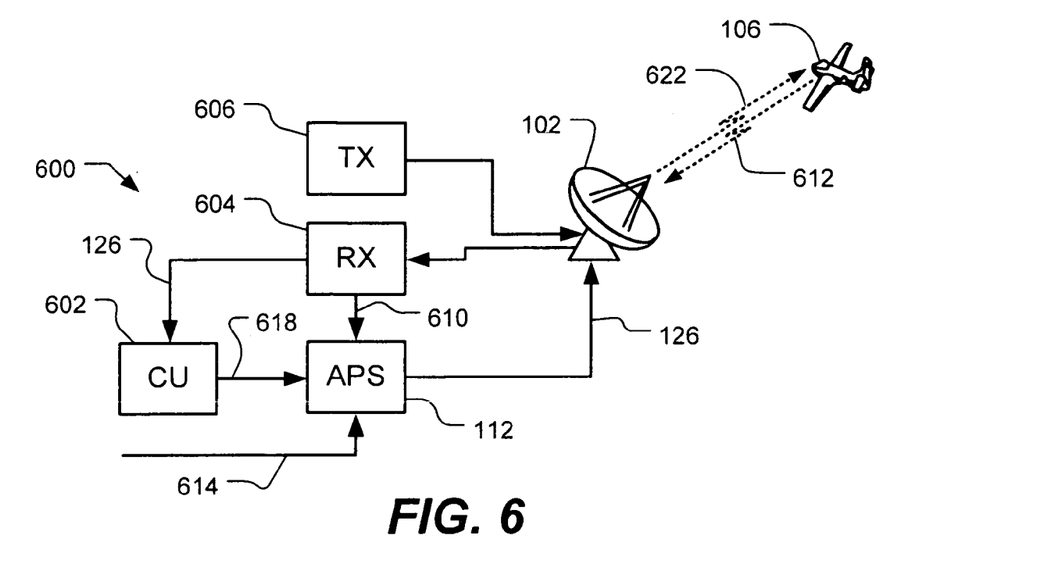
FIG. 6 is a block diagram of a system for calibrating the boresight of an antenna system in accordance with another embodiment of the present invention.

Target navigation data can be received through a separate system, or through the antenna. For example, FIG. 6 illustrates a block diagram of a system, shown generally at 600, for calibrating the boresight of an antenna 102 in accordance with an alternate embodiment of the present invention. The system includes a calibration unit 602, receiver 604, and antenna pointing subsystem 112. Navigation data describing the movement of the calibration target is received from the calibration target 106, through a radio signal 612 to the antenna system, and processed by a receiver 604. For example, the receiver may extract digital target navigation data from the radio signal. The receiver provides the digital target navigation data 610 to the antenna pointing subsystem. The antenna pointing subsystem is therefore in communication with the calibration target so as to receive the target navigation data.

The antenna pointing subsystem 112 uses the target navigation data 610 in conjunction with platform navigation data 614 from the platform to control the antenna pointing direction. Typically, the antenna pointing subsystem controls the antenna with azimuth and elevation commands 122 provided to the antenna. The antenna pointing subsystem points the antenna nominally towards the calibration target 106, although there may be mispointing due to boresight errors in the antenna. The antenna pointing subsystem also accepts bias values 618 from the calibration unit 602 to offset the antenna from the nominal direction.

The calibration unit 602 provides bias values 618 to the antenna pointing subsystem 112 while monitoring the signal quality 126 provided by the receiver 604. The bias value corresponding to the maximum signal quality is then used to determine the boresight correction factors. This process of measuring a bias value at a particular azimuth and elevation will be referred to as a calibration sequence. More than one calibration sequence (more than one set of bias values) can be performed for different pointing directions by moving the calibration target to new positions. The strategy for trying different bias values can be specified by an operator (for example using a keypad control as described above) or can be determined automatically (for example using a computer algorithm). The boresight equations described above can be reliably solved using two calibration sequences to calibrate an antenna, although approximate solutions can be obtained using just a single calibration sequence.

Optionally, the system 600 can include a transmitter 606 to transmit navigation commands through the antenna 102 via a communication link 622 to the calibration target 106. The moving target receives and responds to the navigation commands, moving as directed.

Aspects of the moving calibration target will now be discussed in further detail. As noted above, the calibration target may conveniently be chosen to be an aircraft, such as an unmanned airborne vehicle (UAV). In accordance with one embodiment of the present invention, the calibration target may be preprogrammed with a series of navigation commands to control the movement of the calibration target while boresight calibration is being performed. In accordance with an alternate embodiment of the present invention, the calibration target may accept navigation commands transmitted through a data link between the antenna and the calibration target.

Various approaches to controlling the movement of the calibration target are possible as will now be described. It is desirable during a calibration sequence that the calibration target is moving slowly in azimuth and elevation relative to the antenna. In other words, even though the calibration target is moving, by controlling its movement to be primarily radial with respect to the antenna, it will appear as though it is at a nearly fixed azimuth and elevation relative to the antenna. This can be accomplished, for example, by moving the calibration target directly toward or away from the platform.

It is not essential that the azimuth and elevation be held exactly constant during a calibration sequence, since the antenna pointing subsystem will track changes. It is desirable, however, to maintain the calibration target in a trajectory where the azimuth and elevation change is held to a relatively small amount. For example, as discussed above, elevation errors can change sign with a 180-degree change in azimuth if there is a tilt in the azimuth plane. In such a case, if the calibration target moves relative to the platform orientation by 180 degrees while the bias value is being determined, the resulting elevation bias changes from a positive to a negative value during the calibration period, and the result is inaccurate. This potential problem can be avoided by controlling the calibration target movement so that the azimuth and elevation are relatively constant. Hence, movement of the antenna in azimuth and elevation will be mostly due to motions to stabilize the antenna with respect to platform attitude changes (e.g., roll pitch and yaw due to flight maneuvers of an airborne platform or sea-swell of a seaborne platform), plus the biases injected by the calibration unit. The extent to which the azimuth and elevation are held constant during a calibration sequence will depend on the specific system configuration. For example, small changes in azimuth and elevation occur at large target ranges when the target moves at minimum speed. In general, the less the azimuth and elevation changes during the calibration sequence, the more accurate the boresight correction factors obtained.

Figure 7:
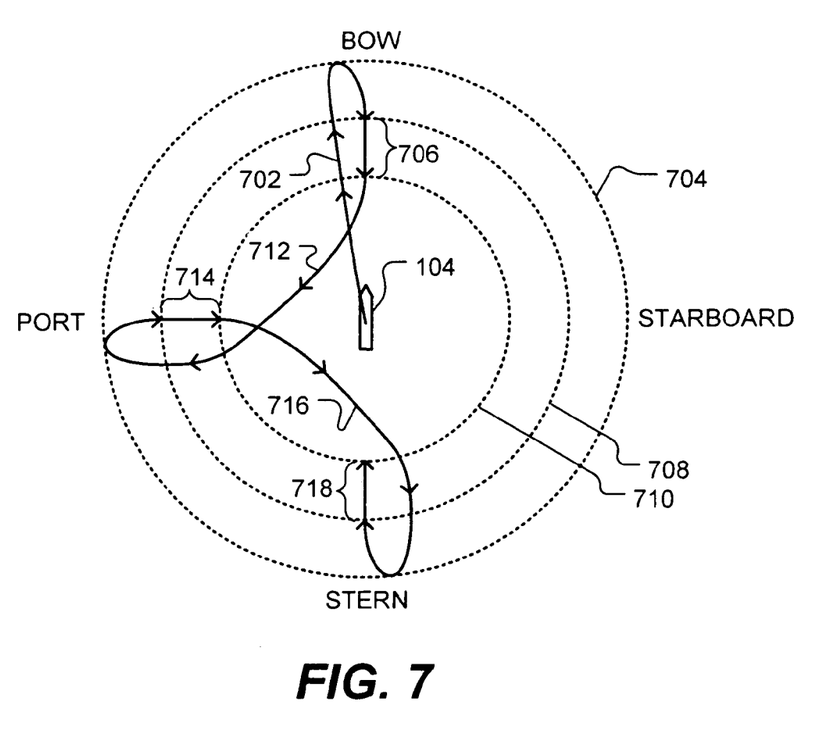
FIG. 7 is an overhead view illustration of an exemplary flight pattern for a moving calibration target in accordance with an embodiment of the present invention.

FIG. 7 illustrates an overhead view of an exemplary flight pattern suitable for use in calibrating two antennas mounted on a platform using a UAV as the calibration target. For this example, the two antennas are mounted fore and aft on a ship, each providing roughly hemispherical coverage, with overlapping coverage to the port and starboard. The flight path consists of a number of legs. During leg 702, the UAV is launched from the moving platform 104 and flown to a waypoint near a communication range limit 704. The UAV is turned around and during leg 706 is flown directly back toward the platform. A calibration sequence can be performed while the UAV is between two range limits, an outer range limit 708 and inner range limit 710, as discussed further below. If necessary, the UAV can be turned around and leg 706 repeated, for example, to provide additional time for determining the bias values corresponding to maximum signal quality at that pointing angle.

Next, the UAV is flown 712 to a second waypoint, about 90 degrees in azimuth from the first waypoint. For example, the first waypoint may be directly off the bow of the platform, and the second waypoint directly to the port or starboard side of the platform. During the next leg 714, the UAV is again flown directly back toward the platform, and a calibration sequence performed while the UAV is between the outer range limit 708 and inner range limit 710. During leg 714, both the fore and aft antennas may be calibrated. If necessary, the UAV can be returned to the second waypoint and leg 714 repeated to provide additional measurement time.

The UAV is then flown 716 to a third waypoint, located about 90 degrees in azimuth from the second waypoint (about 180 degrees from the first waypoint), and leg 718 used for measurement of bias values for the aft antenna. The UAV can then be returned to the platform, or continue flying for use in other purposes. The bias values measured on each of the legs can then be used to determine boresight correction factors for the fore and aft antennas.

Of course, a smaller or greater number of waypoints than illustrated in FIG. 6 may advantageously be used. For example, calibration of a single antenna can be performed with two waypoints. For the example just illustrated, two waypoints oriented at roughly 45 degrees and 135 degrees in azimuth relative to the bow of the ship can be used to calibrate both antennas if the coverage area of the antennas is large enough. Alternately, more than two waypoints may be used for an antenna to provide more accurate boresight calibration factors by using curve fitting or least squares analysis as discussed above.

Although the example in FIG. 7 has the UAV flying directly toward the platform during calibration, the flight profile can be rearranged so that the UAV is flown directly away from the platform during calibration. For example, the UAV can be flown first to the inner range limit 610, then flown toward the outer range limit 708 directly away from the ship while calibrating, then turned around before reaching the communication range limit 704. As yet another example, the flight profile can include a mixture where in some calibration legs the UAV flies toward the platform and, in other calibration legs, the UAV flies away from the platform.

As yet another example, the UAV may be flown directly away from the platform, and several calibration sequences performed. While the UAV is near the platform, and a strong signal is being received even in the presence of boresight errors, an initial calibration can be performed using initial coarse bias values. For example, initial coarse bias values may be about 1 to 3 degrees. This yields a preliminary set of boresight correction factors which are applied during subsequent antenna pointing. A second calibration can then be performed as the UAV moves further from the platform using smaller bias values. For example, the second bias values may be about 0.1 to 0.3 degrees. Revised boresight correction factors can then be obtained. Additional calibrations can be performed as the UAV moves even further using smaller bias values to provide increased accuracy in the boresight correction factors. Many other flight patterns will occur to one of skill in the art having possession of this disclosure.

Further explanation of the range limits will now be provided. The outer range limit 708 is determined based on the communications capability of the antenna, while taking into account that there may be boresight errors and biases further offsetting the antenna for the correct pointing direction. The inner range limit 710 is determined based on the desired boresight accuracy and accuracy of the navigation data. Longer minimum ranges are needed when less accurate navigation data is available as is discussed further. For example, GPS navigation data provides an accuracy of about 30 feet. If both the platform and UAV use GPS data, the resulting uncertainty can result in a pointing error of 0.07 degrees if the platform and UAV are separated in range by 48,000 feet. In contrast, if the platform and UAV are separated by 240,000 feet, the resulting pointing error drops to 0.015 degrees. Thus, better pointing accuracy can usually be obtained by using longer minimum ranges. On the other hand, most communications systems have practical limits on the range at which they may operate.

Operation can be enhanced when the antenna provides both a broad and narrow antenna beam. For example, the antenna may include a hemispherical coverage (non-directional) broad beam (for which boresight calibration is not needed), and a directional high gain narrow beam (for which boresight calibration is needed). The broad beam and narrow beam may achieve different communication ranges. For example, the communication range limit 704 (FIG. 7) can be determined by the broad beam antenna. Since the outer range limit 708 is determined by the narrow beam antenna, it may actually exceed the communication range limit, and thus boresight calibration can begin as soon as the UAV is turned around and flying directly back toward the platform. Optionally, using the broad beam for communication with the calibration target can enhance the calibration procedure because pointing errors in the narrow beam antenna do not affect communications using the broad beam. Alternately, a separate communications link (using a separate antenna, receivers, and transmitters) between the UAV and antenna pointing subsystem can be used to relay navigation data from the UAV back to the antenna pointing subsystem.

If better boresight accuracy is desired, multiple iterations of the calibration sequence can be performed. For example, two iteration calibrations can be performed as will now be described. The first iteration proceeds as just described, using the broad beam antenna to communicate with the UAV. This provides an initial set of boresight calibration factors. Then a second calibration iteration is performed where the narrow beam antenna is used to communicate with the UAV. This allows an increased communication range limit 704. An increased inner and outer range limit can be used during the second boresight calibration, reducing the effects of navigation data errors, to provide an improved set of boresight calibration factors. Multiple iterations can also be performed, providing successively improved boresight calibration accuracy as the calibration target is moved further away from the antenna.

Figure 8:
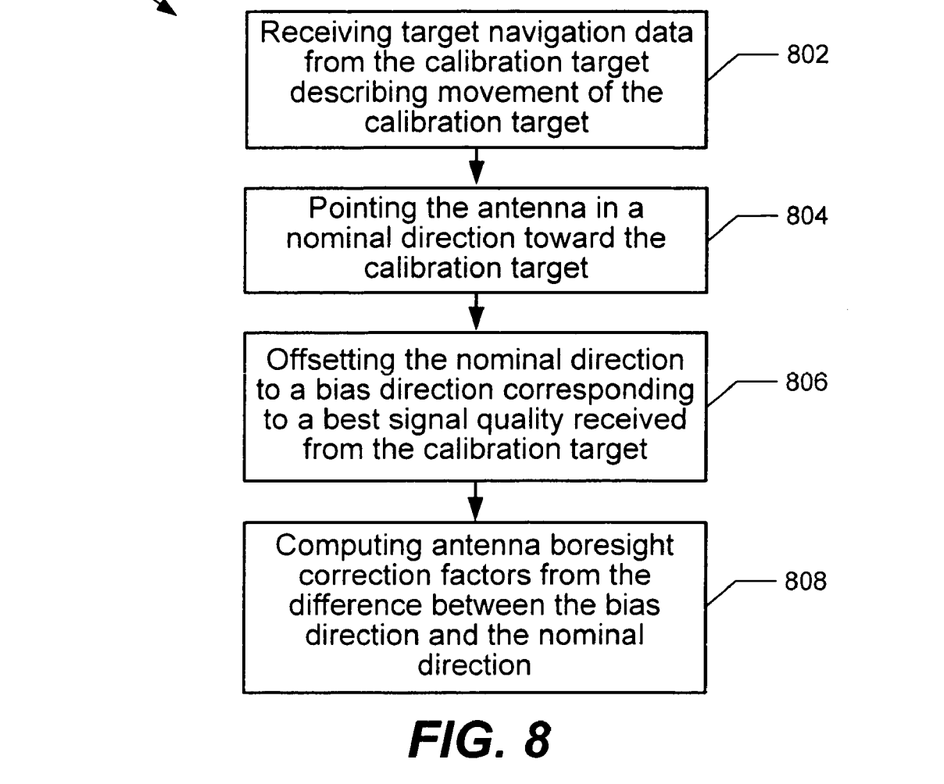
FIG. 8 is a flow chart of a method of boresighting an antenna mounted on a moving platform in accordance with an embodiment of the present invention.

Finally, in accordance with another embodiment of the present invention, a method of boresighting an antenna mounted on a moving platform is shown in flow chart form in FIG. 8. The boresighting method, shown generally at 800, can be performed using a concurrently moving calibration target. The method includes receiving 802 target navigation data from the calibration target describing movement of the calibration target. For example, target navigation data may be transmitted from the calibration target and received through the antenna as described above. Alternately, target navigation data may be received indirectly from the calibration target, for example via a communication system separate from the antenna. The method also includes pointing 804 the antenna in a nominal direction toward the calibration target. Pointing is accomplished using the target navigation data to compensate for the movement of the calibration target and using platform navigation data to compensate for motion of the moving platform, for example as described above. For example, a line of sight vector to the target can be translated and rotated to take into account the platform attitude.

Figure 9:
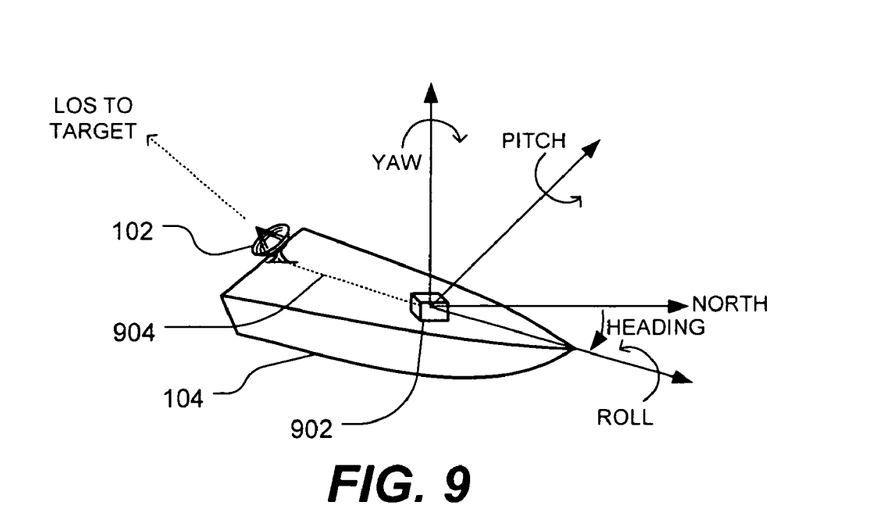
FIG. 9 is an illustration of a coordinate frame for describing platform attitude in accordance with an embodiment of the present invention.

While pointing the antenna, various correction factors may be applied. For example, as illustrated in FIG. 9, the antenna may 102 be located some distance 904 from the ship's inertial navigation system 902. This distance is sometimes referred to as lever arm. When the ship undergoes roll, pitch, and yaw, these rotations are typically measured relative to the center of gravity of the ship. Roll, pitch and yaw will thus cause translations in the attitude and location of the antenna. Pointing the antenna can also include applying lever arm corrections to take into account the distance between the antenna and the platform navigation sensors. For example, lever arm corrections can be applied by translating and rotating the line of sight vector to account for the lever arm, roll, pitch, and yaw.

Corrections can also be applied to accommodate atmospheric bending. As is known in the art, radio waves are refracted slightly in the atmosphere. Typically, this results in elevation angles appearing higher than a straight geometric computation indicates. Various tabulations of correction factors as a function of radio frequency and elevation are known to one of skill in the art. Hence, pointing the antenna can also include applying corrections for atmospheric bending.

The method 800 also includes offsetting 806 the nominal direction to a bias direction corresponding to a best signal quality received from the calibration target. This offsetting is performed concurrently with pointing 804 the antenna. The nominal direction may be offset from the actual direction of the target due to boresight error. As discussed above, a variety of different deviation amounts and directions may be applied sequentially to the nominal antenna pointing direction and signal quality measured at each deviated direction until the best signal quality is found. Preferably, the range of deviations used is sufficiently large to encompass both the main lobe and a sidelobe of the antenna. This can help to avoid erroneously selecting a local maximum signal quality corresponding to a sidelobe of the antenna. Deviation of the antenna pointing can be controlled automatically, following a predetermined algorithm, or manually through a user interface device, for example as discussed above.

Offsetting occurs simultaneously with pointing 804 such that the antenna is stabilized for platform and target movement, and thus the mispointing due to boresight error will remain roughly constant. Hence, the bias direction corresponding to the best signal quality provides a measurement of the boresight error. The method also includes computing 808 antenna boresight correction factors from the difference between the bias direction and the nominal direction. As discussed above, multiple measurements of the bias direction at different azimuths can be made to determine the boresight correction factors. Additionally, the method can be repeated as the calibration target is moved further away from the antenna to refine the antenna boresight correction factors as described above.

Optionally, the method can include communicating a series of navigation commands to the calibration target to control the movement of the calibration target. For example, navigation commands may be transmitted through the antenna to the calibration target as described above. The navigation commands move the calibration target along a predefined trajectory or to a series of predefined waypoints, for example as described above.

In some systems, it may be desirable to encrypt either or both of the target navigation data and the target navigation commands. Accordingly, the method may include decrypting target navigation data and encrypting target navigation commands.

In sum, it will now be appreciated by one of skill in the art that the method and systems described within provide a significant improvement over systems which require the platform and calibration target to remain stationary during boresight calibration. In accordance with embodiments of the present invention, boresight calibration can be performed while the antenna is stabilized for platform and calibration target movement. This makes it possible to use, for example, a UAV as a calibration target, avoiding the need for fixed calibration targets. Furthermore, boresight calibration can be performed while the platform is underway, reducing the need to interrupt a mission. Boresight correction factors can be stored and applied in software, avoiding the need for mechanical shimming or pinning of the antenna. Boresight calibration using the disclosed techniques can enhance the accuracy of open loop pointing of an antenna.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method of boresighting an antenna mounted on a moving platform using a concurrently moving calibration target, comprising:
   a) receiving target navigation data from the calibration target describing movement of the calibration target;
   b) concurrently,
      i) pointing the antenna in a nominal direction toward the calibration target using the target navigation data to compensate for the movement of the calibration target and using platform navigation data to compensate for motion of the moving platform, and
      ii) offsetting the nominal direction to a bias direction corresponding to a best signal quality received from the calibration target; and
   c) computing antenna boresight correction factors from a difference between the bias direction and the nominal direction.

2. The method according to claim 1 further comprising repeating step a), b), and c) as the calibration target is moved further away from the antenna to refine the antenna boresight correction factors.

3. The method according to claim 2 further comprising using a broad antenna beam to communicate with the calibration target during a first iteration of step a), b), and c) and using a narrow antenna beam to communicate with the calibration target during a second iteration of step a), b), and c).

4. The method according to claim 1 wherein the target navigation data includes position information.

5. The method according to claim 1 wherein pointing the antenna further comprises receiving platform navigation data from a navigation sensor on the platform.

6. The method according to claim 1 wherein receiving target navigation data further comprises:
   transmitting the target navigation from the calibration target to the antenna; and
   receiving the target navigation data using the antenna.

7. The method according to claim 1 further comprising controlling movement of the calibration target.

8. The method according to claim 7 wherein controlling movement of the calibration target comprises:
   moving the calibration target to a first waypoint and performing a first iteration of steps a), b), and c); and
   moving the calibration target to a second waypoint and performing a second iteration of steps a), b), and c).

9. The method according to claim 8 wherein the first waypoint and the second waypoint are about 90 degrees apart in azimuth relative to the antenna.

10. The method according to claim 7 wherein controlling movement of the calibration target comprises maintaining the target at a substantially constant azimuth and elevation relative to the antenna.

11. The method according to claim 1 wherein receiving target navigation data further comprises communicating a series of navigation commands to the calibration target to control the movement of the calibration target.

12. The method according to claim 11 wherein communicating a series of predefined navigation commands comprises:
   transmitting the navigation commands to the calibration target using the antenna; and
   receiving the navigation commands at the calibration target.

13. The method according to claim 11 wherein communicating a series of predefined navigation commands comprises moving the calibration target along a predefined trajectory.

14. The method according to claim 11 wherein communicating a series of predefined navigation commands comprises moving the calibration target to a series of predefined waypoints.

15. The method according to claim 1 wherein offsetting the nominal direction further comprises sequentially deviating the antenna pointing to a plurality of deviated directions and measuring signal quality at each deviated direction.

16. The method according to claim 15 wherein sequentially deviating the antenna pointing is performed over a range of deviated directions sufficient to encompass a main lobe and at least one side lobe of the antenna.

17. The method according to claim 15 wherein sequentially deviating the antenna pointing further comprises:
   controlling the deviated direction through a user interface device; and
   monitoring the signal quality through a user interface device.

18. The method according to claim 1 further comprising open loop pointing the antenna using the antenna boresight correction factors.

19. A system for boresighting an antenna on a ship at sea, comprising:
   a moving calibration target configured to respond to navigation commands and send target navigation data to the antenna;
   an antenna pointing subsystem in communication with the calibration target so as to receive the target navigation data and being operationally coupled to the antenna so as to control an antenna pointing direction, wherein the antenna pointing subsystem is configured to use the target navigation data in conjunction with navigation data from the ship to point the antenna in a nominal direction toward the target while compensating for target motion and ship motion; and
   a calibration subsystem operationally coupled to the antenna pointing subsystem and configured to
      (i) provide bias values to the antenna pointing system to offset the antenna from the nominal direction while taking signal quality measurements and
      (ii) use the signal quality measurements and bias values to compute a set of boresight calibration factors.

20. The system according to claim 19 wherein the calibration target comprises an aircraft.

21. The system according to claim 19 wherein the calibration target comprises an unmanned airborne vehicle.

22. The system according to claim 19 wherein the calibration target comprises a ship at sea.

23. The system according to claim 19 wherein the calibration target comprises a land vehicle.

24. The system according to claim 19 wherein the calibration target is configured to accept navigation commands transmitted through a data link separate from the antenna.

25. The system according to claim 19 wherein the signal quality measurements are a measurement type selected from the group of measurement types consisting of signal strength, signal to noise ratio, error correction rate, and bit error rate.

26. The system according to claim 19 wherein the navigation commands are preprogrammed in the calibration target.

27. The system according to claim 19 wherein the calibration target is configured to accept navigation commands transmitted through a data link between the antenna and the calibration target.

28. A system for boresight calibrating an antenna subsystem mounted on a moving platform using a concurrently moving calibration target, comprising:
   a receiver coupled to the antenna subsystem and configured to receive target navigation data from the moving calibration target via the antenna;
   an antenna pointing subsystem coupled to the antenna subsystem and receiver and configured to direct the antenna beam nominally toward the moving calibration target using the target navigation data and platform navigation data to compensate for motions of the moving calibration target and moving platform; and
   a calibration unit configured for interface to the antenna pointing subsystem and receiver so as to inject into the antenna pointing system bias values to cause a deviation in the direction of the antenna beam and to accept from the receiver signal quality values, whereby the bias values and the signal quality values are useable for computation of boresight calibration factors.

29. The system according to claim 28 wherein the calibration unit is further configured to calculate the bias values and provide the bias values to the antenna pointing subsystem.

30. The system according to claim 28 wherein the calibration unit further comprises a unit that can be detachably connected to the antenna pointing subsystem.

31. The system according to claim 28 further comprising a transmitter coupled to the antenna subsystem and configured to transmit navigation commands to the moving calibration target via the antenna.

* * * * *